_Patented Dec. 11, 1951_ 2,578,206

UNITED STATES PATENT OFFICE 2,578,206

ALKENYLATION OF PHENOLS

Herman Pines and Jerome A. Vesely, Chicago, Ill., assignors to Universal Oil Products Company, Chicago, Ill., a corporation of Delaware No Drawing. Application September 26, 1947, Serial No. 776,422

5 Claims. (Cl. 260—621)

This invention relates to the catalytic interaction of a phenol with a diene. It is more particularly concerned with the production of alkenyl phenols by reacting a phenol containing a substitutable hydrogen atom attached to the ring with an alkadiene, in which only one of the double bonds is attached to a tertiary carbon atom, in the presence of a phosphoric acid-ether alkenylation catalyst.

We have found that phenol and certain substituted phenols such as alkyl phenols can be converted into valuable unsaturated derivatives thereof by reaction with polyolefinic hydrocarbons in the presence of phosphoric acid-ether catalysts. These derivatives are useful as intermediates in the preparation of plastics, elastomers, resins, germicides, medicinals, and the like.

In one embodiment our invention relates to a process which comprises reacting a phenolic compound having a substitutable hydrogen atom attached to the ring with a diene at condensation conditions in the presence of a phosphoric acid-ether condensation catalyst.

In a more specific embodiment our invention relates to an alkenylation process which comprises reacting a phenolic compound having a substitutable hydrogen atom attached to the ring with an alkadiene, in which only one of the double bonds is attached to a tertiary carbon atom, at alkenylation conditions in the presence of a phosphoric acid-ether alkenylation catalyst.

Phenolic compounds that may be reacted with dienes in accordance with our invention must contain at least one substitutable nuclear hydrogen atom, i. e., a hydrogen atom that is attached to the ring and that is capable of being replaced by an alkenyl or a cycloalkenyl group. Examples of such compounds are phenol; cresol; polyhydric phenols such as hydroquinone and catechol; alkoxyphenols such as guaiacol, para-methoxy phenol, and para-ethoxy phenol, in which the number of carbon atoms in the alkyl group is small; naphthol; and the like.

The compounds with which phenols are reacted in our process comprise dienes, preferably dienes in which only one of the double bonds is attached to a tertiary carbon atom. When diolefins of the latter type are contacted with phenols containing a substitutable hydrogen atom attached to the ring in the presence of a phosphoric acid-ether condensation catalyst at relatively mild reaction conditions, condensation between the diene and the phenol is effected at the more reactive double bond attached to the tertiary carbon atom. The less reactive nontertiary double bond does not undergo reaction and, as a result, a phenol with an unsaturated hydrocarbon substituent is produced. If both double bonds of the diene are tertiary or nontertiary, each possesses the same order of reactivity, and it is difficult to react one double bond and not the other. Hence, in general, alkenyl phenols can be obtained in significant yields only when the diene contains one tertiary double bond and one nontertiary double bond. Examples of such dienes, which may be either of the open chain or closed chain variety, i. e., alkadienes or cycloalkadienes, are isoprene, 2-methyl-1,3-pentadiene, 3-ethyl-1,3-heptadiene, 2,6-dimethyl-1,3-heptadiene, 2-methyl-1,3-cyclohexadiene, and 2-methyl-1,4-pentadiene.

The catalysts that may be used in this process comprise those phosphoric acid-ether composites that catalyze the interaction of phenolic compounds containing at least one substitutable nuclear hydrogen atom with dienes. Such substances, because of their comparatively low activity, induce, under the proper reaction conditions, condensation of the tertiary double bond of the diene without concomitant condensation at the nontertiary double bond. These catalysts comprise phosphoric acid and an ether that does not enter into the reaction at the operating conditions employed in the process. The lower aliphatic ethers such as dimethyl ether, diethyl ether, and methyl ethyl ether are examples of suitable ethers. Relatively low molecular weight cyclic ethers such as dioxane and 1,4-epoxycyclohexane also may be used. Of the various acids of phosphorus, orthophosphoric acid ($H_3PO_4$) generally is preferred. The acid need not be anhydrous because, for example, satisfactory catalysts have been prepared from diethyl ether and 85% phosphoric acid. The molal ratio of ether to acid is preferably about 1:1 and should not exceed 2:1 because mixtures containing more than this proportion of ether possess very little catalytic activity.

The process of our invention may be carried out in batch operation by placing a quantity of the catalyst in a reactor equipped with a stirring device, adding the phenol, heating or cooling to the desired reaction temperature, slowly adding the diene while mixing the contents of the reactor, and recovering the product. The preferred method of operation is of the continuous type. In such an operation the catalyst and reactants are continuously charged to a reaction zone wherein intimate contacting is effected. The effluent from the reaction zone is passed to a settler wherein a separation is effected between the hydrocarbon and catalyst phases. At least a portion of the catalyst phase may be recycled to the reactor and the hydrocarbon phase may be continuously processed for recovery of the desired products.

The process of this invention may be conducted at temperatures within the range of from about −10° C. to about 100° C. and preferably between 0° C. and about 75° C. At temperatures below −10° C. very little reaction takes place; at temperatures above 100° C. the nontertiary double bond as well as the tertiary double bond tends to enter into the reaction with a resultant decrease in the yield of alkenyl phenol.

Our process should be conducted in the liquid phase, hence the pressure should be such that substantially all of the reactants are in the liquid phase at the reaction temperature employed.

The contact time is not particularly critical. It may be from about several minutes to several hours.

A molecular excess of the phenol over the diene in the reaction zone is desirable because it favors condensation of the phenol with the diene and tends to suppress polymerization.

The following examples are given to illustrate our invention but they are not intended to limit the generally broad scope of said invention. The experiments shown in the examples were made by charging a phenol and catalyst, and a solvent when such was employed, to an alkylating flask provided with a stirrer, thermometer, dropping funnel, and a dry ice reflux condenser. The flask was placed in a hot water bath or an ice bath depending upon the temperature at which the reaction was to be conducted. When the operating temperature had been reached, isoprene was slowly added to the flask while the contents thereof were stirred. After the olefin addition had been completed, the stirring was continued for an additional hour. Thereafter, the product was transferred to a separatory funnel and placed in an ice bath until the acid layer settled out. The organic layer was recovered and washed with water several times to remove residual acid, and then with excess 30% potassium hydroxide to dissolve the unreacted phenolic compound. The alkali-insoluble product was extracted with ether. The extract was treated with 30% potassium hydroxide to remove traces of phenolic compound, then with water, and finally it was dried over potassium carbonate and distilled. The alkali-soluble product was acidified with dilute hydrochloric acid and extracted with ether. The ether extract was treated several times with water, then with sodium bicarbonate solution, then with water, and finally it was dried over sodium sulfonate and distilled.

Example I

Phenol was pentenylated with isoprene using an approximately equimolar mixture of 85% phosphoric acid and diethyl ether as a catalyst. For comparative purposes, a similar experiment is shown in which 85% phosphoric acid alone was used as the catalyst.

| Experiment No | 1 | 2 |
|---|---|---|
| Catalyst: | | |
| 85% phosphoric acid, g | 36.8 | 25 |
| Diethyl ether, g | 25.0 | 0 |
| Molal ratio of ether to acid | 1.1 | 0 |
| Phenol, g | 47 | 47[1] |
| Isoprene, g | 17 | 17 |
| Temperature, °C | 25 | 28 |
| Time, hours | 2 | 3 |
| Yield, mol per cent based on isoprene chgd: | | |
| Pentenyl phenols | 35 | 18 |
| Chromans and coumarans | | 13 |

[1] 50 cc. benzene and 35 cc. of toluene were added as a solvent.

It can be seen that the yield of pentenyl phenol obtained with the catalyst comprising phosphoric acid and ether was nearly double the yield obtained with phosphoric acid alone.

Example II

The effect of using a high ratio of ether to acid is shown by the following data.

| Experiment No | 3 |
|---|---|
| Catalyst: | |
| 85% phosphoric acid, g | 24.5 |
| Diethyl ether, g | 35 |
| Mol ratio of ether to acid | 2.3 |
| Phenol, g | 47 |
| Isoprene, g | 17 |
| Temperature, °C | 20 |
| Time, hours | 1.3 |
| Yield, mol per cent based on isoprene chgd: | |
| Pentenyl phenols | 0 |
| Chromans and coumarans | 0 |

It can be seen that the phosphoric acid-ether mixture possessed substantially no catalytic activity.

Example III

Para-cresol was pentenylated using a phosphoric-ether catalyst at two different temperatures. The operating conditions and results are given below.

| Experiment No | 4 | 5 |
|---|---|---|
| Catalyst: | | |
| 85% phosphoric acid, g | 34 | 15 |
| Diethyl ether, g | 25 | 9 |
| Molal ratio of ether to acid | 1.2 | 1.0 |
| Para-cresol, g | 54 | 54 |
| Isoprene, g | 17 | 17 |
| Temperature, °C | 17 | 36–41 |
| Time, hours | 3 | 1.5 |
| Yield, mol per cent based on isoprene chgd.: | | |
| Pentenyl phenols | 37 | 27 |
| Chromans and coumarans | 14 | 42 |

It can be seen that appreciable yields of monopentenyl cresol were obtained and that the lower temperature favored the production of this compound whereas the higher temperature favored the production of chromans and coumarans.

We claim as our invention:

1. A pentenylation process which comprises subjecting a mixture of phenol and isoprene, said mixture containing an excess of phenol, to the action of an alkenylation catalyst consisting essentially of an approximately equal molecular composite of orthophosphoric acid and diethyl ether at a temperature of from about 0° C. to about 75° C. and a pressure sufficient to maintain a substantial portion of the reactants in the liquid phase.

2. A pentenylation process which comprises subjecting a mixture of para-cresol and isoprene, said mixture containing an excess of para-cresol, to the action of an alkenylation catalyst consisting essentially of an approximately equimolecular composite of orthophosphoric acid and diethyl ether at a temperature of from about 0° C. to about 75° C. and a pressure sufficient to maintain a substantial portion of the reactants in the liquid phase.

3. A process for the production of an alkenyl phenol which comprises reacting a phenol having a substitutable hydrogen atom on the aromatic ring with a diene containing at least one tertiary carbon atom and in which only one of the double bonds is attached to a tertiary carbon atom, in the presence of a catalyst complex consisting essentially of a lower aliphatic ether and a phosphoric acid containing more than 3 atoms of oxygen per molecule, said catalyst containing not more than 2 mols of said ether per mol of said acid, at a temperature of from about −10° C. to about 100° C. and a pressure sufficient to maintain a substantial portion of the reactants in the liquid phase.

4. The process of claim 3 further characterized in that the phenol is in molecular excess of the diene.

5. A process for the production of an alkenyl phenol which comprises reacting a phenol having a substitutable hydrogen atom on the aromatic ring with a diene containing at least one tertiary carbon atom and in which only one of the double bonds is attached to a tertiary carbon atom, in the presence of a catalyst complex consisting essentially of a lower aliphatic ether and orthophosphoric acid, said catalyst containing not more than 2 mols of said ether per mol of said acid, at a temperature of from about −10° C. to about 100° C. and a pressure sufficient to maintain a substantial portion of the reactants in the liquid phase.

HERMAN PINES.
JEROME A. VESELY.

REFERENCES CITED

The following references are of record in the file of this patent:

UNITED STATES PATENTS

| Number | Name | Date |
| --- | --- | --- |
| 2,283,465 | Schaad | May 19, 1942 |
| 2,411,578 | Lieber et al. | Nov. 26, 1946 |
| 2,470,902 | Rosenwald | May 24, 1949 |
| 2,471,922 | Axe | May 31, 1949 |